No. 879,784. PATENTED FEB. 18, 1908.
J. MATEKA.
FEED BUCKET.
APPLICATION FILED NOV. 4, 1907.

2 SHEETS—SHEET 1.

Witnesses:

Inventor:
John Mateka
by Joshua R. H. Potts
Atty.

No. 879,784.

PATENTED FEB. 18, 1908.

J. MATEKA.
FEED BUCKET.
APPLICATION FILED NOV. 4, 1907.

2 SHEETS—SHEET 2.

Witnesses:
H.S. Austin
J.E. Sheehy

Inventor:
John Mateka
by Joshua R.H. Potts
Atty

UNITED STATES PATENT OFFICE.

JOHN MATEKA, OF CHICAGO, ILLINOIS.

FEED-BUCKET.

No. 879,784.  Specification of Letters Patent.  Patented Feb. 18, 1908.

Application filed November 4, 1907. Serial No. 400,604.

*To all whom it may concern:*

Be it known that I, JOHN MATEKA, a citizen of the United States, and residing in Chicago, county of Cook, and State of Illinois, have invented certain new and useful Improvements in Feed-Buckets, of which the following is a specification.

My invention relates to feed buckets for horses and has particular reference to feed buckets equipped with means for supporting them in front of the horse when hitched to a vehicle.

The object of my invention is to provide a feed or water bucket for horses which may be set upon the ground or other support as an ordinary bucket, and which may be readily attached to the pole or shafts of a vehicle when it is desirable to feed the horses while hitched.

Other objects will appear hereinafter.

With these objects in view, my invention consists generally in a bucket having an arm pivotally connected thereto means for attaching the free end of the arm to the draft members of a wagon that is, the pole or shaft and means for holding the arm in extended position.

My invention further consists in various details of construction and arrangements of parts all as will be hereinafter fully described and particularly pointed out in the claims.

Figure 1:
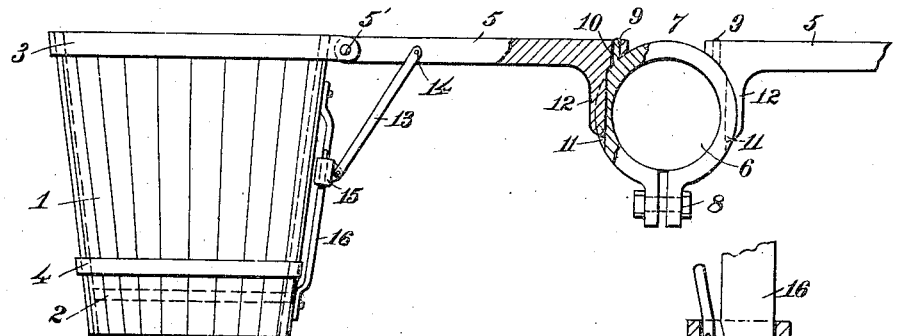
Figure 4:
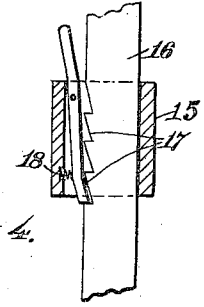
Figure 2:
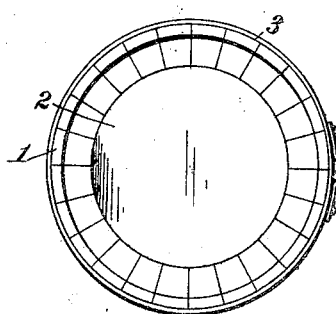
Figure 3:
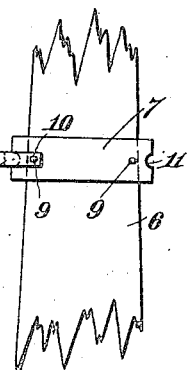
Figure 3:
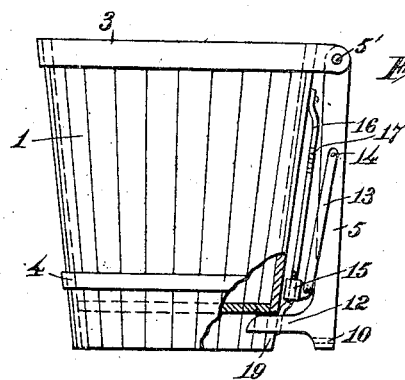
Figure 5:
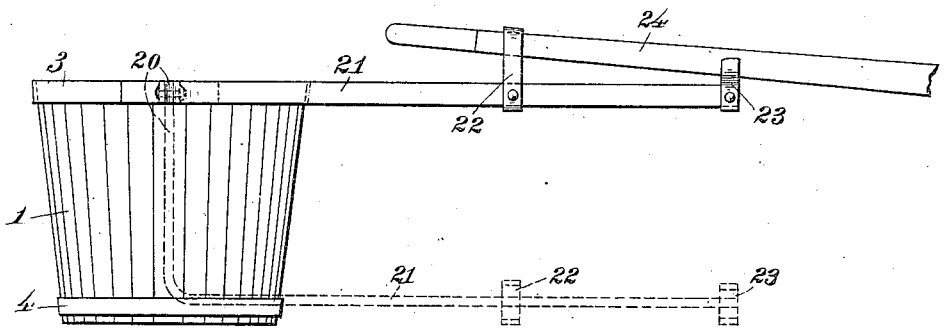
Figure 6:
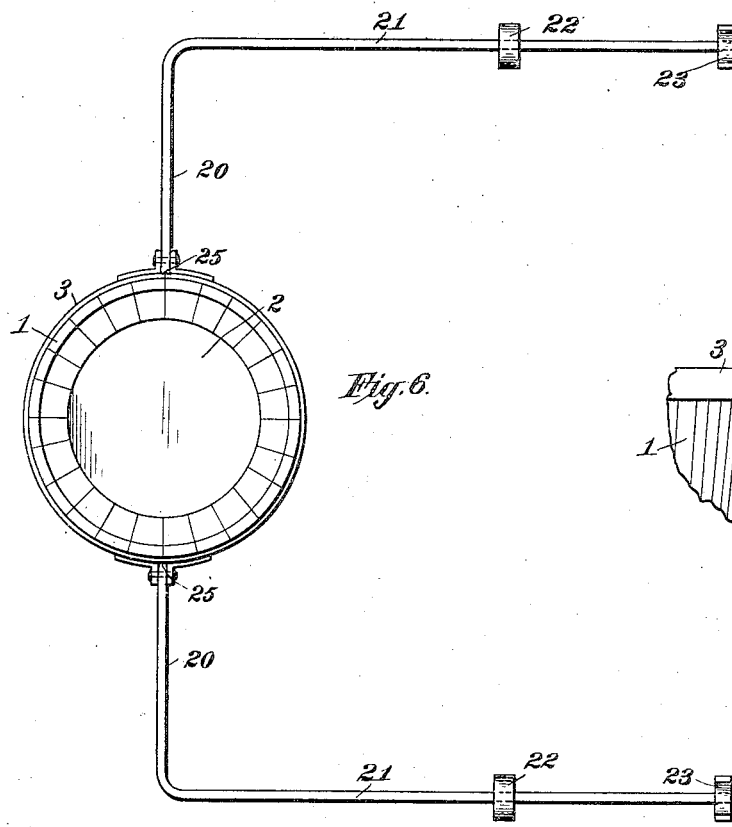
Figure 7:
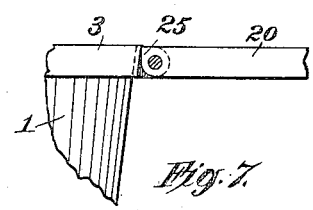

My invention will be more readily understood by reference to the accompanying drawings forming a part of this specification and in which, Figure 1 is an elevation partly in section of a bucket embodying my invention in its preferred form, illustrating the same attached to the pole of a wagon, Fig. 2 is a plan view thereof, Fig. 3 is an elevation, partially in section, of the bucket with the supporting device folded against the sides, Fig. 4 is a detail of the connection between the brace and bucket, Fig. 5 is a side elevation of a modified form of bucket supporting device as applied to a pair of shafts, the arm being shown, in dotted lines, in folded position, Fig. 6 is a plan view of the device shown in Fig. 5 and Fig. 7 is a detail of the connection between the supporting arm and bucket.

The feed bucket comprising my invention may be arranged for attachment to a pole of a wagon or to the shafts and while the main features of each arrangement are the same a slight difference of construction of the supporting arm is necessary.

In Figs. 1 to 4 I illustrate a bucket equipped with means for attaching it to the pole and in the remaining figures as arranged for attachment to a pair of shafts. Referring to Figs. 1 to 4, 1 indicates the feed bucket having the bottom, 2 and the upper and lower hoops, 3 and 4 respectively. To the upper hoop is pivotally connected an arm 5 by means of which the bucket is detachably secured to the end of the wagon pole, 6, or to a ring, 7 fixed thereon. The ring 7 is split as shown and is secured to the pole by a bolt, 8 and further is provided with means for detachably securing the bucket carrying arm, 5 thereto. As the pole is employed when a double team is being used, I provide means for attaching two bucket carrying arms to the ring, 7, separately and independently of each other. To this end, each side of the ring is provided with means for attaching an arm. This consists in a pin or lug, 9 adapted to engage a hole, 10 in the end of the arm, 5, and a vertically disposed groove, 11 to receive the lug, 12 extending at right angles from said arm. The lug, 9, entering the hole, 10, and the lug, 12, resting against the ring, 7, hold the arm, 5 horizontally; and the groove, 11 prevents the arm from twisting sidewise.

To prevent the bucket from swinging downwardly from the pivot point 5', I provide a brace bar, 13. One side of the bar 13 is pivotally attached, as at 14, to the arm, 5, and the other end to a block or slide, 15, mounted upon a bar, 16 arranged vertically upon the side of the bucket beneath the point, 5'. The bar 16 is provided with a ratchet, 17, which is engaged by a pawl 18 on the block, 15, as the arm is swung upwardly with relation to the bucket the block, 15 slides upwardly upon the bar, 16 and as the arm reaches a horizontal position, the pawl engages the ratchet, 17 and prevents it from dropping, and also prevents the bucket from dropping when the device is attached to the pole. When removed from the pole the arm is folded down parallel with the side of the bucket as shown in Fig. 3, the lug, 11 entering a notch, 19 in the side of the bucket below the bottom, 2. It should be noted that the arm, 5, is shorter than the height of the bucket and that the bottom is at a sufficient distance from the lower edge of the bucket to permit the lug, 11 to pass freely beneath it, hence the bucket may be set upon the ground or other support as an ordinary bucket.

To attach the bucket to a pair of shafts, I provide a pair of arms and pivotally connect them to the opposite sides of the bucket. These, each comprise a portion, 20 which extend radially from the bucket when raised and a portion, 21 which extends parallel with the shafts. The portion, 21 of each arm is provided with a ring, 22, arranged at a suitable point between the portion, 20 and its outer end and the outer end is provided with a socket member, 23. The portions, 21 are the same distance apart when extended as the shafts of the vehicle, and in attaching the device to the shafts, 24, the rings, 22 are passed over the end of the shafts and the socket members, 23 rest against the lower side thereof. (See Fig. 5.) To prevent the device from collapsing while in use the inner ends of the arm portions, 20 are provided with the shoulders, 25 which impinge against the upper hoop, 3, when in extended position. The portions, 20 of the arms are of less length than the height of the bucket, hence, do not interfere with the bucket when sitting upright.

Having described my invention what I claim as new and desire to secure by Letters Patent is:

1. In a device of the class described, a bucket in combination with an arm pivotally connected thereto, means for connecting said arm to the draft member of a vehicle and means for maintaining said bucket in extended position, substantially as described.

2. In a device of the class described, a bucket in combination with an arm pivotally connected thereto, means for connecting said arm to the pole of a vehicle, a brace member pivotally connected to said arm, a slidable connection between the other end of said brace member and said bucket and means for preventing downward movement of said connection, substantially as described.

3. In a device of the class described, a bucket in combination with an arm pivotally connected thereto, means for connecting said arm to the pole of a vehicle, a vertically disposed bar secured to said bucket, a slide mounted upon said bar, a brace member pivotally connected at one end to said arm and at the other end to said slide and a ratchet connection between said slide and said bar, substantially as described.

4. In a device of the class described, a bucket, in combination with an arm pivotally connected thereto, said arm having a hole arranged in its free end and a lug adjacent to said hole and extending at right angles from said arm, a member adapted to be secured to the pole of a vehicle and having a lug adapted to engage the hole in said arm and a groove adapted to be engaged by the lug on said arm, substantially as described.

5. In a device of the class described, a bucket in combination with an arm pivotally connected thereto, said arm having a hole arranged in its free end and a lug adjacent to said hole and extending at substantially right angles from said arm, a device adapted to be secured to the pole of a vehicle and to engage with said hole and said lug to hold said arm in extended position, said arm being of less length than the height of said bucket and said bucket being notched below its bottom to receive said lug, substantially as described.

In testimony whereof I have signed my name to this specification in the presence of two subscribing witnesses.

JOHN MATEKA.

Witnesses:
ESTHER A. SWANSON,
HELEN F. LILLIS.